June 30, 1953 F. S. ELSAESSER 2,643,880
SHEET TRANSFER MEANS
Filed Nov. 14, 1947 3 Sheets-Sheet 1
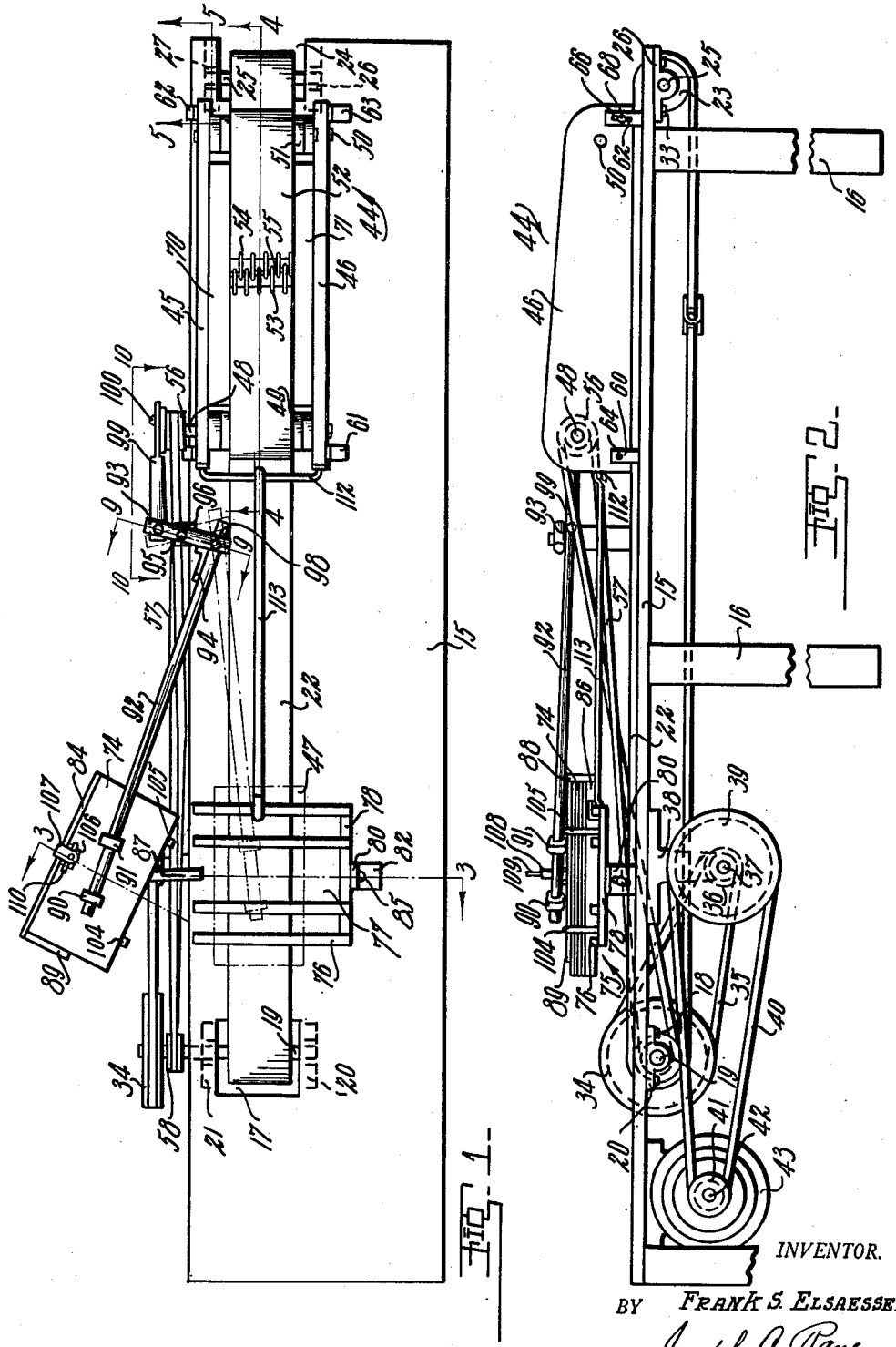
INVENTOR.
Frank S. Elsaesser
BY Joseph A. Pave
ATTY.

June 30, 1953 F. S. ELSAESSER 2,643,880
SHEET TRANSFER MEANS
Filed Nov. 14, 1947 3 Sheets-Sheet 2
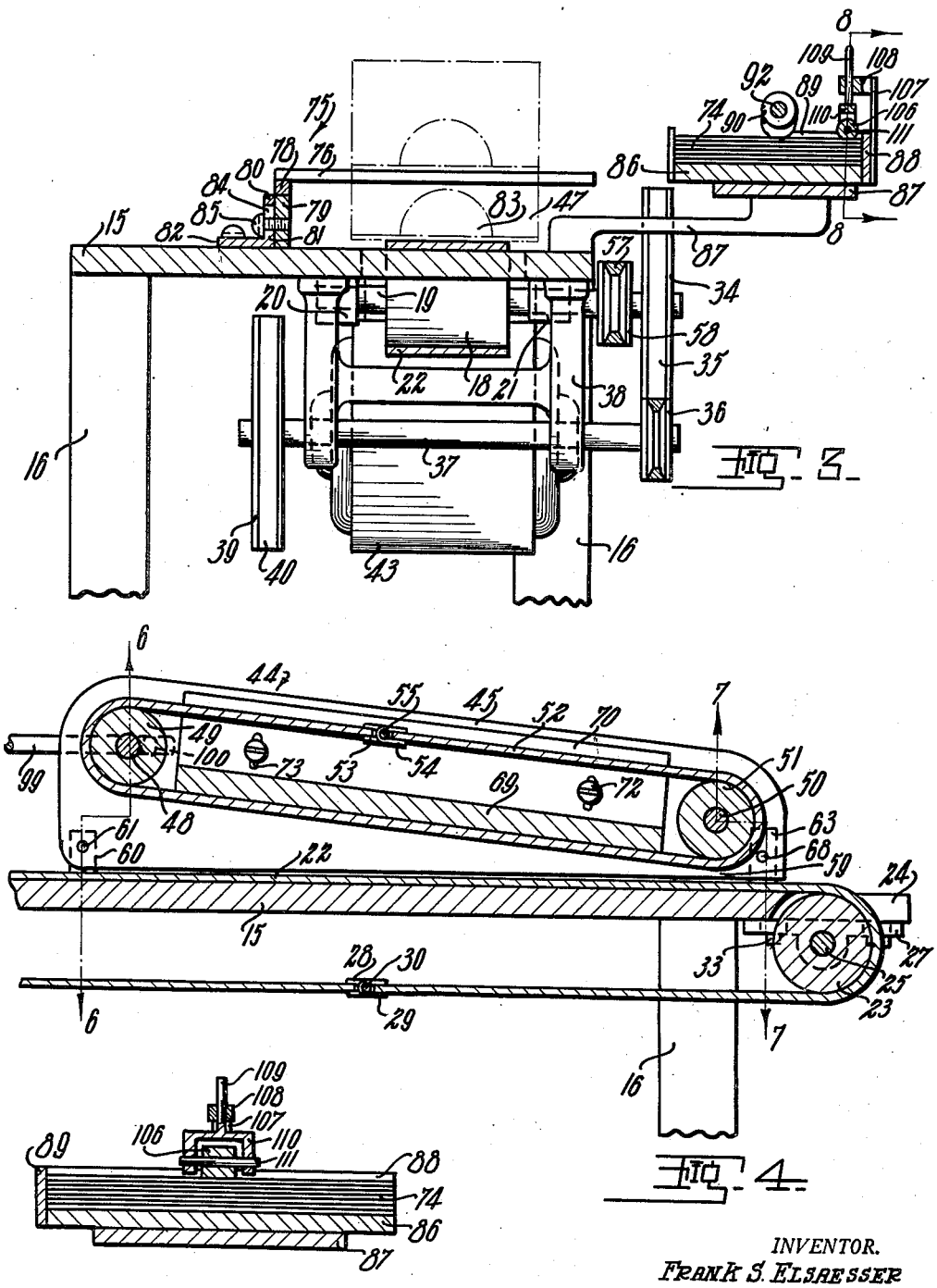
INVENTOR.
FRANK S. ELSAESSER
BY
Joseph A. Rave
ATTY.

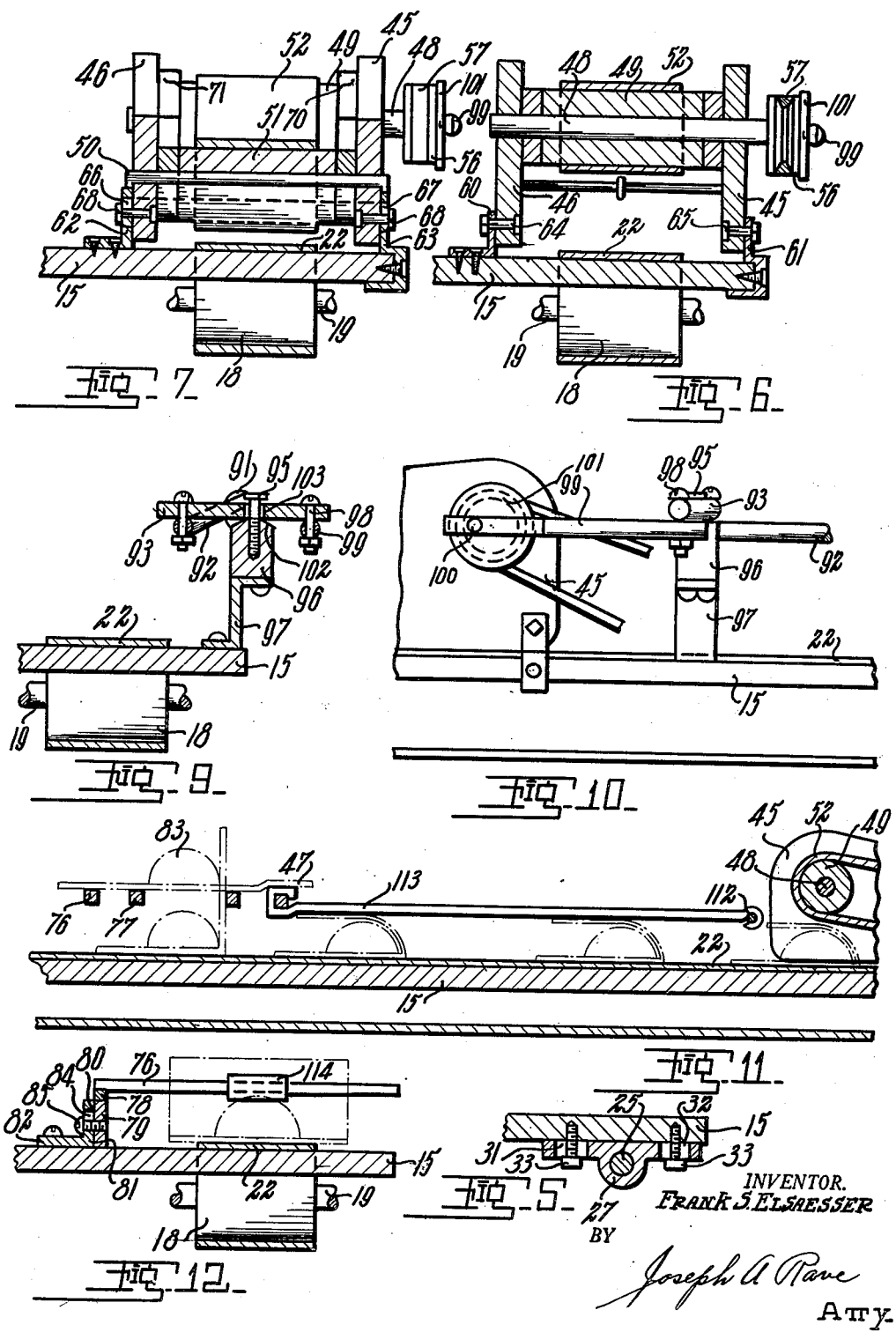

Patented June 30, 1953

2,643,880

UNITED STATES PATENT OFFICE 2,643,880

SHEET TRANSFER MEANS

Frank S. Elsaesser, Cincinnati, Ohio

Original application May 11, 1945, Serial No. 593,285. Divided and this application November 14, 1947, Serial No. 786,121

8 Claims. (Cl. 271—42)

This invention relates to improvements in Hamburg steak forming machines and particularly to a means for arranging the paper relative to the machine for forming the patty, as used in cooking or frying the same.

This invention is an improvement on applicant's co-pending application Serial No. 582,331 filed March 12, 1945, now Patent No. 2,528,125.

This application is a division of applicant's pending application Serial No. 593,285, filed May 11, 1945, for Hamburg Steak Patty Forming Machine, now Patent No. 2,509,971.

Machines for this purpose have been made in the past but were in the main impractical since no adequate means were provided to prevent the meat from adhering to the forming parts of the machine, or the process was so slow in operation as to be uneconomical to use. Other machines required the handling of heavy parts such as a feed cylinder from which the so-called ground meat was fed to the patty forming parts.

The machine of this invention obviates all of these difficulties resulting in a machine that rapidly produces Hamburg steak patties as well as other meat patties such as "country style" pork sausage, and the like.

The machine of this invention is semi-automatic in nature in that it automatically positions the paper and folds same relative to the ground meat instead of requiring these operations to be performed manually so that the Hamburg steak patty is adequately covered by paper as is customary.

It is therefore the main object of this invention to provide a machine to produce meat patties such as are used in Hamburg steak, which requires the operator merely to place the required amount of ground meat on the machine.

Another object of this invention is the provision of a machine that will accomplish the above object and which is of simple construction and can be operated by inexperienced operators.

Another object of this invention is the provision of a meat patty forming machine in which the patties are expeditiously produced and in which sanitation is attained in an economical manner.

Another object of this invention is the provision of a Hamburg steak patty forming machine in which the paper arranging mechanism sets the rate of production and insures a continuous operation of the machine without the patties crowding one another.

Another and particular object of the present invention is the provision of a device for automatically feeding paper or paper articles from a stack onto a support or the like.

Other objects and advantages of the present invention should be readily apparent by reference to the following specification considered in conjunction with the accompanying drawings forming part thereof and it is to be understood that any modifications may be made in the exact structural details there shown and described, within the scope of the appended claims, without departing from or exceeding the spirit of the invention.

In the drawings:

Fig. 1 is a top plan view of a machine embodying the principles of this invention.

Fig. 2 is a front elevational view of the machine illustrated in Fig. 1.

Fig. 3 is an enlarged transverse sectional view taken on line 3—3 of Fig. 1.

Fig. 4 is an enlarged longitudinal sectional view of a portion of the machine taken on line 4—4 of Fig. 1.

Fig. 5 is an enlarged fragmentary sectional view taken on line 5—5 of Fig. 1.

Fig. 6 is a fragmentary sectional view taken on line 6—6 of Fig. 4.

Fig. 7 is a fragmentary sectional view taken on line 7—7 of Fig. 4.

Fig. 8 is an enlarged sectional view taken through a portion of the machine on line 8—8 of Fig. 3.

Fig. 9 is an enlarged fragmentary sectional view taken on line 9—9 on Fig. 1.

Fig. 10 is an elevational view of a portion of the machine showing the paper feeding actuating mechanism.

Fig. 11 is a semi-diagrammatic view illustrating the action of the machine.

Fig. 12 is a view similar to Fig. 3 showing a modification in the structure thereof.

Throughout the several views of the drawings, similar reference characters are employed to denote the same or similar parts.

The paper feeding device, of this invention, is shown in connection with a Hamburg steak patty forming machine although the paper feed mechanism will be useful in other machines where sheets of paper or paper articles are to be individually arranged relative to a support or the like. The ground meat patty forming machine illustrated in the drawings and subsequently to be described will find its principal use in restaurants, dining rooms and like establishments which feature or serve Hamburg steak or "Hamburgers" as they are popularly called. It has been found that Hamburg steak patties can be formed on this machine at a rate requiring but a single attendant that formerly needed three and four persons and that the patties are of uniform physical properties, that is of the same area, thickness and density whereas formerly each maker developed his own technique which resulted in variations of these properties wherefore, the resulting cooked Hamburg steaks were of different degrees of being done.

The machine comprises a table member 15 supported in any suitable or desirable manner as by legs 16. Intermediate its ends the table 15 is provided with an opening 17 of a size to receive a drum or pulley 18. The pulley 18 is secured to a shaft 19 rotatably mounted in bearings 20 and 21, respectively, located one on each side of the opening 17. Partially encircling the pulley 18 is a belt 22 made of flexible material and adapted to be washed or otherwise cleaned from time to time. The belt 22 is a conveyor belt for conveying the meat to and through a mashing unit or patty former.

The conveyor belt 22 partially encircles a second drum or pulley 23, located some distance from the pulley 18, for example as shown in the drawings, at one end of the table 15 in a recess 24 provided in said table therefore. It should be understood that instead of the recess 24 at the end of the table, an opening similar to opening 17, could be provided in the table for the said pulley 23 and conversely the opening 17 may be formed as a recess at the end of the table. The pulley 23 is secured to a shaft 25 rotatably mounted in bearings 26 and 27 secured to the table, respectively, one on each side of the recess 24. The ends of the belt 22 are joined to one another to make it an endless conveyor and this joining may be accomplished in any suitable or desirable manner. As illustrated in the drawings, the joining is effected by providing each end of the belt with projecting metal loops 28 and 29, which interleaf to form a passageway through which a pin 30 passes. By this construction, the ends of the belt may be readily separated and the belt removed from the machine for washing or otherwise cleaning.

The bearings 26 and 27 are utilized to supply the belt 22 with the necessary tension and to take up any slack that may develop therein. To accomplish this the bearing brackets 26 and 27 are each provided with elongated apertures 31 and 32 through which the mounting bolts 33 pass and whereby the brackets with their shaft 25 may be adjusted toward and from the shaft 19.

The drum or pulley 18 is the driving pulley for the conveyor belt 22 and has its shaft 19 projecting beyond one side of the table 15 to have secured thereto a pulley 34 about which passes transmission belt 35. The transmission belt 35 also passes around pulley 36 secured to one end of intermediate shaft 37. The intermediate shaft 37 is rotatably mounted in a bracket 38 shown as secured to the underside of the table 15 and depending therefrom. Secured to the other end of the intermediate shaft 37 is a pulley 38 having extending therearound a transmission belt 40. This transmission belt 40 also extends around the driving pulley 41 on the motor shaft 42 of electric motor 43. It will be noted that the pulleys are of different diameters which is for the purpose of reducing the speed of drum or pulley 18 from that of motor 43 and it should be noted that any other speed reducing transmission device may be arranged between the driving motor and said conveyor belt driving pulley or drum.

It will be noted that the conveyor belt driving pulley 18 and the driven pulley 23 are mounted to be tangent to the table top wherefore, the upper layer or reach of the conveyor belt moves along the said table top. Near the driven drum or pulley 23 the conveyor belt 22 passes beneath the mashing or flattening mechanism indicated in general by the reference numeral 44. This mashing or flattening mechanism gives the final shape or form to the Hamburg steak patty.

The mashing or flattening mechanism 44 comprises side members 45 and 46 spaced from one another a distance to permit a paper sheet 47 to pass between them. Rotatably mounted in the side members 45 and 46 near their front ends and some distance above the conveyor belt 22, is a shaft 48 having secured to it a drum or pulley 49. The masher side members 45 and 46 near their rear ends also have rotatably mounted therein a shaft 50, which has secured to it a drum or pulley 51. It will be noted, particularly from Fig. 4, that the shaft 50 is located much nearer the conveyor belt than shaft 48. Extending around the drums or pulleys 49 and 51 is a belt 52, made endless by joining the ends thereof to one another through the usual belt lacing comprising metal loops 53 and 54 extending respectively from each end of the belt 52 toward the other and interleaved to form a passageway through which a connecting pin 55 passes. By this construction the said belt 52 may be removed from the masher mechanism for cleaning and/or replacement purposes as can the conveyor belt 22.

The drum or pulley 49 is the driving pulley while the drum or pulley 51 is the driven or idler pulley for which reason the shaft of pulley 49 extends beyond the masher side and has secured to it a pulley 56 partially encircled by a transmission belt 57. The transmission belt 57 also partially encircles a second pulley 58 on the shaft 19 of the conveyor belt driving pulley 18. The transmission belt pulleys 56 and 58 are of such diameter that the belts 22 and 52 have the same rate of travel. As will be seen in Fig. 4, the upper layer or reach of conveyor belt 22 is directly below and opposed to the bottom layer or reach of masher belt 52. These belt layers or reaches are to travel in the same direction, that is, from left to right, as seen in the drawings wherefore, the transmission belt 57 is twisted, as seen in Figs. 1 and 2, causing the shaft 19 to rotate clockwise and the shaft 49 to rotate counterclockwise.

As noted above and can be seen from Fig. 4, the shaft 19 is a greater distance from belt 22 than the shaft 49 thereby providing a contracting throat which constitutes the masher or flattening chamber with the final thickness or thinness of the Hamburg steak determined by the space between belts 22 and 52 at the point where the belt 52 passes around the lowest point of the drum or pulley 51 and this point is indicated in the drawings by the reference character 59.

The operation of the masher 44 is as follows:

The conveyor belt 22 carries a quantity of ground meat into the large end of the mashing or flattening chamber and the ground meat is engaged on its upper side by the belt 52, which being driven, assists in moving the said meat through the chamber. Since the said belts 22 and 52 gradually converge toward one another, the meat is likewise reduced in thickness until the narrowest point 59 of the chamber is reached whereupon the driven or idler drum 51 completes the flattening of the ground meat into a patty ready for cooking. The original quantity of ground meat that entered the flattening chamber was the right amount to produce the desired Hamburg steak.

The masher mechanism 44 is secured in place by a pair of brackets 60 and 61, respectively, connecting the front ends of side members 45 and 46 to the table top 15 and by brackets 62 and 63, which respectively, secure the rear ends of said side members to the table top. The front brackets are permanently secured to the table and have a pivotal connection at 64 and 65 with their respective side members, while the brackets 62 and 63 are likewise permanently secured to the table and they have an adjustable connection at 66 and 67 with their side members. This adjustable connection consists of a slot in each bracket 62 and 63 through each of which passes a clamp bolt 68. From this it will be seen that the exit throat 59 of the masher chamber may be varied in thickness by adjusting the masher mechanism about the pivots 64 and 65 to raise or lower the drum or pulley 51 relative to the conveyor belt 22.

In order to effect the mashing or flattening of the meat as it passes through the masher chamber, the lower portion of the belt 52 is backed up by a pressure board or buckboard 69. The pressure board 69 may be mounted in position through wings 70 and 71 respectively, projecting from the sides thereof and having passing therethrough, into the masher side members 45 and 46, bolts 72. By providing the pressure board wings 70 and 71, with elongated apertures 73 for the bolts 72 the pressure board 69 may be adjusted toward and from the conveyor belt 22.

The quantity of ground meat used to make a Hamburg steak is usually measured out by a scoop similar to the well known "ice cream scoop" and is placed on a piece of prepared paper, that is, paper generally rendered moisture proof and is then covered with a second piece of similar paper. The size of the papers used is such that it completely covers the flattened or mashed Hamburg steak patty and it is between these papers that the meat extends while passing between the belts 22 and 52.

In the above identified application use is made of a single paper which both underlies the Hamburg steak patty and covers it and which paper was arranged relative to the ground meat by manual methods. It was found that these methods of covering the meat were cumbersome and somewhat laborious and the following method and apparatus invented.

The paper 47, shown in dot and dash lines in Fig. 1, is in position to receive the ground meat to be formed into the patty. The individual papers are shifted from a pile or stack 74 onto the supporting frame indicated in general by the reference numeral 75. This supporting frame 75 comprises a series of bars 76 which extend transversely of the conveyor belt 22 in spaced apart relation with a larger opening or space 77, between said bars at substantially the midpoint of the supporting structure. The transverse bars 76 have their outer ends each joined to a longitudinal member or bar 78 having a depending leg 79. The leg 79 has face contact with the vertical arm 80 of an angle bracket 81 secured to the table 15 through its horizontal arm 82.

The supporting frame 75 is positioned above the conveyor belt 22 a distance to permit the ground meat ball 83 from the scoop to pass freely thereunder and since Hamburg steaks are made to different sizes, requiring different quantities of meat, the said frame 75 is adjustable toward and from the conveyor belt 22. To accomplish this adjustment the vertical arm 80 of the bracket 81 is provided with an elongated aperture 84 through which passes the clamp bolt 85 into a tapped aperture in the leg 79.

The stack 74 of individual papers 47 is disposed on a shelf 86 behind the table 15 and which shelf, as seen in Fig. 1, has its longitudinal axis angularly disposed to the longitudinal axis of the table 15 for a purpose to be made clear. The shelf 86 may be supported relative to the table in any suitable or desirable manner preferably with the shelf at least as high above the table 15 and conveyor 22 as the paper support frame 75 is above said table and conveyor, for example, as shown in the drawings, by the arm 87. In order to prevent disarrangement of the papers 47 from the stack 74 the shelf is provided at its rear with a rail 88 and at its one end with a second rail 89.

The individual papers 47 are removed from the stack 74 automatically by one or more friction fingers or pickers 90 and 91 carried by the outer end of an arm 92. The arm 92 is secured to cross member 93 to have their axes in a definite angular relation and which connection may be accomplished in any suitable or desirable manner as by bracket 94. The cross member or cross bar is pivoted at 95, intermediate its ends to a post 96 upstanding from table 15. The post 96 may be secured to the table in any suitable or desirable manner as by bracket 97. The other end of the cross bar 93 has a pivotal connection at 98 with the free end of a piston connecting rod 99. As seen most clearly in Fig. 10, the connecting rod is rotatably mounted at 100 eccentrically of a disc 101 in the manner of an eccentric crank. The disc 101 is secured in any suitable or desirable manner to the flattening mechanism driving shaft 48 as by keying the same thereto or bolting to the pulley 56.

By reference particularly to Figs. 1, 2, 9 and 10, it will be appreciated that with the shaft 48 rotating in counter-clockwise direction the connecting rod 99 will be actuated to the left, during the first half of a revolution of the disc 101, for oscillating the cross arm 93 in counter-clockwise direction and thereby swing the arm 92 from the solid line position thereof to the phantom line position of Fig. 1. This movement of the arm 92 through the friction fingers or pickers 90 and 91 moves or slides the uppermost paper 47 from the stack 74 onto the support frame 75. The arm 92 exerts a slight pressure on the uppermost paper through the friction fingers or pickers and to accomplish this the upper surface of the post 96 is rounded or arched as at 102 and the cross bar pivot 95 passes through an enlarged aperture 103 in the said cross bar 93. The operation of these parts is as follows, the disc 101 rotating clockwise, as seen in Fig. 10, counter-clockwise as seen in Fig. 2, tends to elevate the pivot or crank 100 thereby tending to raise the connecting rod 99. The connecting rod acting on one end of the cross bar 93, tends to rock the said cross bar in a counter-clockwise direction about the pivot 95 as seen in Fig. 9, and actually does so to the extent permitted by the clearance of the pivot aperture 103. This action of the cross bar 93 causes the arm 92 to be depressed so that its friction fingers or pickers 90 and 91 grip or press against the uppermost paper 47 of the stack. When the disc 101 reaches the end of a half revolution, the arm 92 is in its phantom line position. The disc 101 in going through its second half revolution reacts oppositely on its crank pin or pivot 100 and connecting rod 101 thereby tending to reversely oscillate the cross bar 92 and actually effect the raising of the arm 92 to a point to pass above the paper stack 74. Continued rotation of the disc 101 continues the operation of the arm 92 as above described to deposit a single paper from the stack onto the frame 75 for each rotation of the disc 101.

To assist in preventing the discharge or transfer of more than one sheet of paper 47 at a time, the shelf has upstanding from its front edge a pair of light springs 104 and 105 which hold back the stack but do not interfere with the frictional pressing or gripping action between the grippers 90 and 91 and the paper sheet while a transfer is taking place. The transfer or discharge of a single sheet of paper 47 causes the hold back spring 104 and 105 to be deflected in the direction of movement of said paper sheet without causing the sheet to in anywise bend or buckle; this takes place whether the uppermost sheet of a full stack is being transferred or the lowermost sheet on the shelf 86. To further assist in maintaining the stack in proper position a light weight is placed on top of the stack comprising a hold down roller 106. The hold down roller 106 is freely rotatable and any suitable or desirable means may be employed to keep same in position while imposing no restraint against movement of the paper by the arm 92 and its pickers. The means shown in the drawings for this purpose comprise a bracket 107 carried by the shelf 86 and having a guide 108 at its upper end through which a stem 109 freely passes. The stem 109 has at its lower end a forked head 110 carrying an axle 111 on which the hold down roller 106 is freely rotatable.

After a paper sheet 47 is deposited on the support 75 the operator places a scoop or quantity of ground meat 83 thereon over the enlarged space 77 in the support frame. The weight of the ground meat carries the paper with it through the said space 77 to the conveyor belt 22 therebelow. As pointed out above, that paper sheet 47 is large enough to cover the meat and the action of the meat and paper dropping onto the conveyor belt 22 causes the covering portion of the paper to be disposed normal to the belt and to be so positioned by the adjacent transverse bar 76 as illustrated in Fig. 11. The conveyor belt being constantly driven carries the ground meat and paper toward the flattening mechanism beneath the transverse bars 76. As the ground meat passes beneath these bars 76, the covering portion of the paper is folded thereabove. If the masher or flattening mechanism were located adjacent the support frame 75, the ground meat with its paper in covering position would immediately be pressed into engagement, but to permit an inspection and observation of the movement of these parts, the mechanism 44 is somewhat removed from the support frame 75 and means are provided to insure the covering portion of the paper remaining in position and preventing this portion of the paper from assuming its natural flat position until the mashing or flattening mechanism is reached.

Accordingly, the mashing or flattening unit 44 has secured to the forward ends of its side members and extending transversely of the belt 22, a rod 112 to which one end of a guide or paper hold down member 113 is attached. The other end of the guide 113 is attached to the nearest of the transverse bars 76 and the guide extends longitudinally of the conveyor belt 22 substantially down its longitudinal center as illustrated most clearly in Fig. 1. The action or operation of the guide 89 is clearly illustrated in Fig. 11 and holds the covering half of the paper of successive ground meat and paper units in position until they enter the masher and flattening unit throat.

As is well known, ground meat, due to its inherent moisture is slightly sticky and this characteristic may be taken advantage of in holding the covering portion of the paper sheet 47 to the ground meat while being carried to the masher or flattening mechanism. This is accomplished by the modified construction illustrated in Fig. 12, providing one of bars 76 with a loose roller 114 and adjusting the paper supporting frame 75 to the position that the ground meat with its cover paper thereabove is engaged by the roller 90 instead of passing freely thereunder as above described. The guide or paper hold down member 113 may be retained as a safeguard against the covering paper becoming loosened from the ground meat and tending to flatten out.

From the foregoing, it will now be appreciated there has been provided a machine for producing Hamburg steak patties that meets the objects initially set forth.

What is claimed is:

1. In a device of the class described, the combination of a stationary support for a stack of individual paper articles, a second support to one side of the stack for receiving, by transfer, the articles, individually, from the stack, the upper-most article of the stack being at all times above the transfer support, means for transferring said upper-most article from the stack to the transfer support comprising an oscillatable arm overlying the stack and in engagement with the upper-most article for sliding the same to the support upon oscillation to a position over said support, means for supporting said arm and oscillating same for raising said arm from the transfer support to the stack level upon return oscillation of the arm, said arm supporting means comprising a post, a cross arm pivotally mounted intermediate its ends to the post, said cross arm having secured to its one end the oscillatable arm, and actuating means connected to the cross arm other end operable for oscillating the cross arm and biasing the said arm to cause a dropping of the oscillatable arm from the stack height to the transfer support height during transfer of the individual article and for biasing said cross arm for raising the oscillatable arm from the transfer support to the stack level upon return of the oscillatable arm to the stack height.

2. In a device of the class described, the combination of a stationary support for a stack of individual paper articles, a transfer support to one side of the stack for receiving, by transfer, the articles individually from the stack, the upper-most article of the stack being at all times above the transfer support, means for transferring said upper-most article from the stack to the transfer support comprising an oscillatable arm overlying the stack and in engagement with the upper-most article for sliding the same to the support upon oscillation to a position over said support, means for supporting said arm and oscillating same for raising said arm from the support level to the stack level upon return oscillation of the arm, said arm supporting means comprising a post, a cross arm pivotally mounted intermediate its ends to the post, said cross arm having secured to its one end the oscillatable arm, actuating means connected to the cross arm other end operable for oscillating the cross arm and biasing the said arm to cause a dropping of the oscillatable arm from the stack height to the support height during transfer of the individual article and for biasing said cross arm for raising the oscillatable arm from the support level to the stack level upon return of the oscillatable arm to the stack height, said cross arm actuating means comprising a reciprocating connecting rod having one end connected to the cross arm and the other end eccentrically connected to a rotatable disc, and power means for rotating the disc.

3. In a device of the class described the combination of a stationary support for a stack of individually transferable articles, a receiving support at one side of said stack and its support adapted to receive the articles individually, the articles stack support being elevated above the receiving support, an oscillatable arm for transferring the upper-most article from the stack onto the receiving support, means cooperating with said stack for retaining it on the support during the transfer of the upper-most article, and means for oscillating said arm between the top of the stack and the receiving support, including a cross member having a permanent connection with said arm and which cross member is oscillated in the general plane of oscillation of the arm and in a plane normal to the said arm general plane of oscillation, and means for actuating the cross member in said planes.

4. In a device of the class described the combination of a stationary support for a stack of individually transferable articles, a receiving support at the side of said stack and its support adapted to receive the articles individually, the articles stack support being elevated above the receiving support, an oscillatable arm for transferring the upper-most article from the stack onto the receiving support, means cooperating with said stack for retaining it on the support during the transfer of the upper-most article, means for oscillating said arm between the top of the stack and the receiving support, including a cross member having a permanent connection with said arm and which cross member is oscillated in the general plane of oscillation of the arm and in a plane normal to the said arm general plane of oscillation, means for actuating the cross member including a reciprocating connecting rod having pivotal connection with the cross member, and a rotatable disc eccentrically connected with the connecting rod causing during half of a revolution the oscillation of the cross member in the general plane and in the plane normal thereto in one direction, and during the second half of the revolution the reverse oscillation of the cross member in the general plane and in the plane normal thereto.

5. In a device of the class described the combination of a stationary support for a stack of individually transferable articles, an arm pivotally mounted for oscillation from a position on the uppermost article of said stack to a position at one side of and below the upper surface of the stack, means on said arm for engaging the uppermost article of the stack for sliding same from the stack upon oscillation of the arm, a cross bar pivoted intermediate its ends and having the arm secured to one of its ends, a support for the cross bar, means carried by the cross bar support for pivoting the cross bar thereto and for supporting the cross bar for oscillation in a path normal to the plane in which the cross bar is actuated about its pivot so that said cross bar and arm are oscillated simultaneously in planes normal to one another, a reciprocating member carried by the other end of the cross bar for effecting said oscillations of the cross bar and arm, and means cooperating with said stack for retaining the stack in position during the transfer of the uppermost article.

6. In a device of the class described the combination of a stationary support for a stack of individually transferable articles, an arm pivotally mounted for oscillation from a position on the uppermost article of said stack to a position at one side of and below the upper surface of the stack, means on said arm for engaging the uppermost article of the stack for sliding same from the stack upon oscillation of the arm, a cross bar pivoted intermediate its ends and having the arm secured to one of its ends, a support for the cross bar, means carried by the cross bar support for pivoting the cross bar thereto and for supporting the cross bar for oscillation in a path normal to the plane in which the cross bar is actuated on its pivot so that said cross bar and arm are oscillated simultaneously in planes normal to one another, a reciprocating member carried by the other end of the cross bar for effecting said oscillations of the cross bar and arm, a power driven rotatable disc, means eccentrically pivotally connecting the reciprocating member to the disc, and means cooperating with said stack for retaining the stack in position during the transfer of the uppermost article.

7. In a device of the class described the combination of a stationary support for a stack of individual paper articles, a transfer support at one side of and below the stack for receiving, by transfer, the paper articles, individually, from the stack, the uppermost article of the stack being at all times above the transfer support, and means for transferring said uppermost paper article from the stack to the transfer support comprising an arm oscillatable through an angular path from a position overlying and in engagement with the uppermost article of the stack to a position over the support and below the uppermost article of the stack and returned to the position overlying and in contact with the uppermost article of the stack, a pivotally mounted bar at one end of and angularly disposed to the arm, a support having a pivot and a contoured supporting surface for the bar, said contoured supporting surface extending transversely of the plane of movement about the pivot, and means operable on the end of the bar for actuating it and the arm about the bar pivot and biasing the bar for movement on its contoured supporting surface in a direction normal to its plane of movement about the pivot and actuating the arm through its angular path.

8. In a device of the class described the combination of a stationary support for a stack of individual paper articles, a transfer support at one side of and below the stack for receiving, by transfer, the paper articles, individually, from the stack, the uppermost article of the stack being at all times above the transfer support, means for transferring said uppermost paper article from the stack to the transfer support comprising an arm oscillatable through an angular path from a position overlying and in engagement with the uppermost article of the stack to a position over the support and below the uppermost article of the stack and returned to the position overlying and in contact with the uppermost article of the stack, a pivotally mounted bar at one end of and angularly disposed to the arm, a support having a pivot and a contoured supporting surface for the bar, said contoured supporting surface extending transversely of the plane of movement about the pivot, means operable on the end of the bar for actuating it and the arm about the bar pivot and biasing the bar for movement on its contoured supporting surface in a direction normal to its plane of movement about the pivot and actuating the arm through its angular path, and means cooperating with said stack for retaining same in position during the sliding of the uppermost article from the stack.

FRANK S. ELSAESSER.

References Cited in the file of this patent

UNITED STATES PATENTS

| Number | Name | Date |
| --- | --- | --- |
| 175,826 | Dreux | Apr. 11, 1876 |
| 533,039 | Arney | Jan. 29, 1895 |
| 583,376 | Hoppe | May 25, 1897 |
| 1,133,630 | Freeman | Mar. 20, 1915 |
| 2,214,066 | Peters | Sept. 10, 1940 |
| 2,334,223 | Smith | Nov. 16, 1943 |
| 2,347,254 | Cox | Apr. 25, 1944 |